United States Patent
Miyazaki (10) Patent No.: US 9,319,564 B2
(45) Date of Patent: Apr. 19, 2016

(54) SCANNER SYSTEM (75) Inventor: Sadaaki Miyazaki, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 442 days.

(21) Appl. No.: 13/187,345

(22) Filed: Jul. 20, 2011

(65) Prior Publication Data
US 2012/0019880 A1  Jan. 26, 2012

(30) Foreign Application Priority Data

Jul. 20, 2010 (JP) ................................. 2010-163034

(51) Int. Cl.
G09G 3/20 (2006.01)
H04N 1/60 (2006.01)
H04N 1/00 (2006.01)

(52) U.S. Cl.
CPC ............ H04N 1/603 (2013.01); H04N 1/00002 (2013.01); H04N 1/00031 (2013.01); H04N 1/60 (2013.01)

(58) Field of Classification Search
CPC . H04N 1/00002; H04N 1/60; H04N 1/00023; H04N 1/00031
USPC ........... 358/504, 1.2, 1.9, 527, 1.13; 399/182, 399/184; 347/15
See application file for complete search history.

(56) References Cited

U.S. PATENT DOCUMENTS

| | | | | |
|---|---|---|---|---|
| 5,081,529 A | * | 1/1992 | Collette | ........................ 358/504 |
| 6,671,067 B1 | * | 12/2003 | Adam et al. | .................... 358/1.6 |
| 7,320,510 B2 | * | 1/2008 | Nakamura | ......... H04N 1/40012 347/15 |
| 8,736,931 B2 | * | 5/2014 | Hibi et al. | ...................... 358/523 |
| 2004/0130739 A1 | * | 7/2004 | Adam | ................ H04N 1/00068 358/1.9 |
| 2004/0227712 A1 | * | 11/2004 | Miyasaka | ................ G09G 3/20 345/89 |
| 2005/0117948 A1 | * | 6/2005 | Hatta | ................. H04N 1/00132 400/62 |
| 2006/0001892 A1 | * | 1/2006 | Bai | ........................ H04N 1/603 358/1.9 |
| 2006/0018684 A1 | * | 1/2006 | Shimazaki | ......... H04N 1/00002 399/182 |
| 2006/0132867 A1 | * | 6/2006 | Sugiyama | .............. G09G 5/003 358/504 |
| 2011/0080600 A1 | * | 4/2011 | Hibi et al. | ...................... 358/1.9 |

FOREIGN PATENT DOCUMENTS

| | | |
|---|---|---|
| JP | 2001-084361 A | 3/2001 |
| JP | 2002-117101 A | 4/2002 |
| JP | 2003-125227 A | 4/2003 |
| JP | 2004-179874 A | 6/2004 |
| JP | 2006-080967 A | 3/2006 |
| JP | 2006-157163 A | 6/2006 |
| WO | 03/010955 A1 | 2/2003 |

* cited by examiner

*Primary Examiner* — Akwasi M Sarpong
(74) *Attorney, Agent, or Firm* — Merchant & Gould P.C.

(57) ABSTRACT

A scanner system includes: a scanning unit that scans a document and generates scan image data; an image processing unit that performs an image process on first subject image data obtained from the scan image data to generate processed image data in a first case where the image process is instructed to be performed, the image process including: a first kind of image conversion process on the first subject image data using a first input-side color conversion profile; and a color correction process performed after the first kind of color conversion process; and an outputting unit configured to: output the processed image data to an outside in the first case; and output second subject image data obtained from the scan image data without the image process and the first input-side color conversion profile to the outside in a second case where the image process is not instructed to be performed.

9 Claims, 4 Drawing Sheets

SCANNER SYSTEM

CROSS-REFERENCE TO RELATED APPLICATIONS

This application claims priority from Japanese Patent Application No. 2010-163034 filed on Jul. 20, 2010, the entire subject matter of which is incorporated herein by reference.

TECHNICAL FIELD

The present invention relates to a scanner system for outputting processed image data generated by an image process to an outside.

BACKGROUND

There has been disclosed a scanner that generates image data and attaches a unique input profile of the scanner to the image data when outputting the image data. A device using the image data performs color conversion on the image data by using the input profile attached to the image data and a unique output profile of the device so as to generate output image data appropriate for output (for example, display).

SUMMARY

Illustrative aspects of the present invention provide a technology that enables a device for using image data to output an image appropriately reflecting contents of a color correction process.

DETAILED DESCRIPTION

<General Overview>

A User may want color correction (for example, brightness correction, contrast correction, and the like) to be performed on an image represented by image data generated by scanning a document. For example, in a case where the scanner performs a color correction process on image data generated by scanning a document so as to generate color-corrected image data, the scanner generally attaches a unique input profile of the scanner to the color-corrected image data. In this case, a device using the color-corrected image data performs a color conversion process on the color-corrected image data by using the input profile attached to the color-corrected image data and a unique output profile of the device, so as to generate output image data. However, the contents of the color correction process may not be appropriately reflected to an image represented by the output image data. This is because the input profile may not implement a color conversion process to which the contents of the color correction process is appropriately reflected. Therefore, for example, even when a color correction process has been performed to reduce brightness by 10%, an image including a portion whose brightness has not been reduced by 10% may be output.

Therefore, illustrative aspects of the present invention provide a technology that enables a device (hereinafter, referred to as an output-side device) for using image data to output an image appropriately reflecting contents of a color correction process.

According to one aspect of the invention, there is provided a scanner system comprising: a scanning unit that scans a document and generates scan image data; an image processing unit that performs an image process on first subject image data, which is an image process subject obtained from the scan image data, so as to generate processed image data in a first case where the image process is instructed to be performed, wherein the image process comprises: a first kind of image conversion process on the first subject image data using a first input-side color conversion profile; and a color correction process that is performed after the first kind of color conversion process; and an outputting unit that is configured to: output the processed image data to an outside in the first case; and output second subject image data, which is an output subject obtained from the scan image data without the image process, and the first input-side color conversion profile to the outside in a second case where the image process is not instructed to be performed.

In the first case where the image process is instructed to be performed, the scanner system performs the first kind of color conversion process on the first subject image data by using the first input-side color conversion profile, and then performs the color correction process. That is, the scanner system performs the color correction process on the color-corrected image data considering the characteristics of the first input-side color conversion profile. Accordingly, the scanner system can generate and output the processed image data considering the characteristics of the first input-side color conversion profile. Therefore, an output-side device for using the processed image data can output an image appropriately reflecting the contents of the color correction process, as compared to a configuration in which the color correction process is performed on the scan image data.

Incidentally, the scanner system may be configured by only a scanner device, or may be configured by the scanner device and a server. Further, a control method, a computer program and a non-transitory computer-readable medium for storing the computer program for implementing any one of the scanner system, the scanner device and the server are also novel and useful.

Exemplary Embodiments

Exemplary embodiments of the present invention will be described with reference to the drawings.

First Exemplary Embodiment (Configuration of System)

Figure 1:
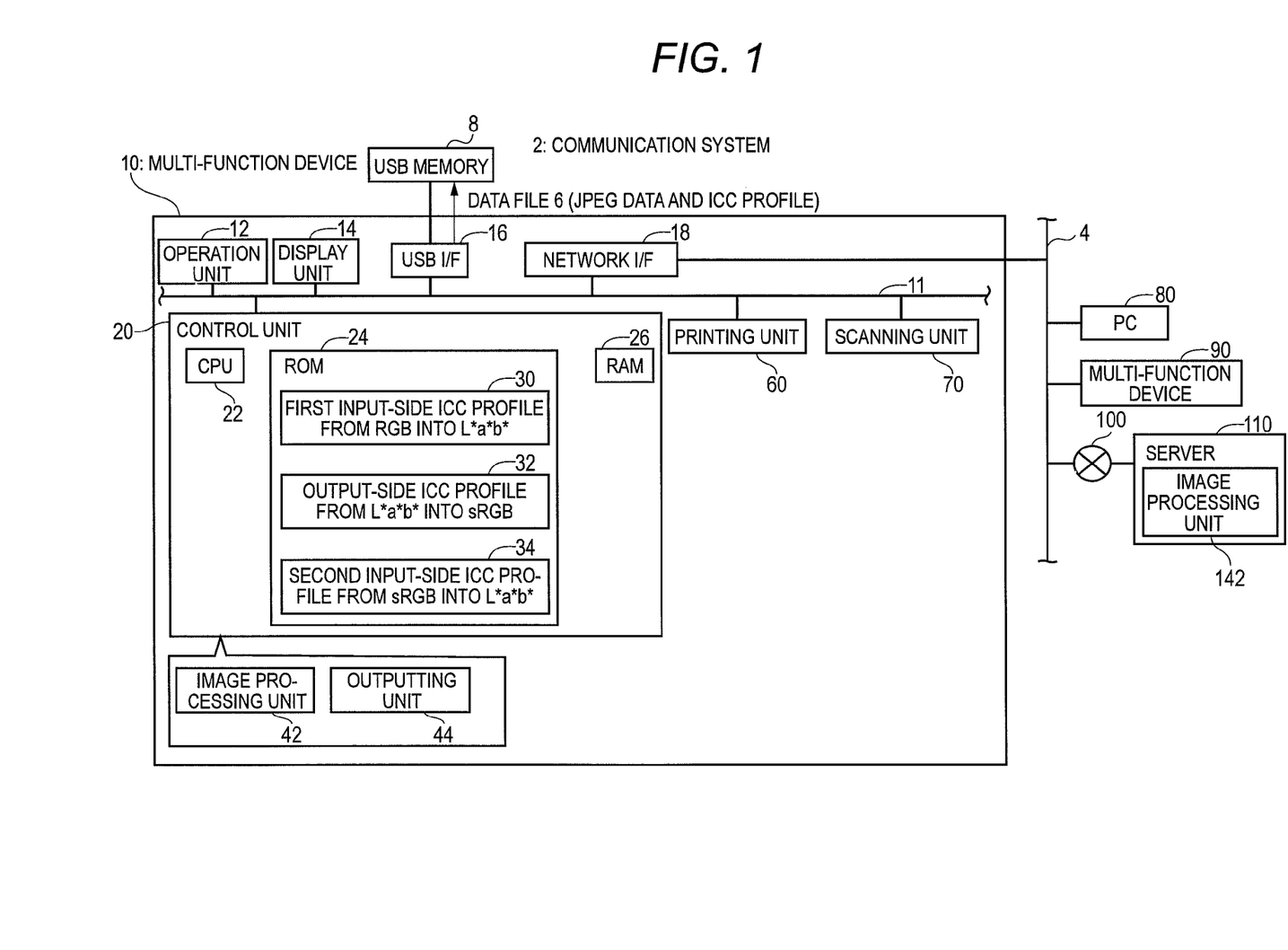
FIG. 1 shows a configuration of a communication system.

A first exemplary embodiment of the invention will be described with reference to the accompanying drawings. As shown in FIG. 1, a communication system 2 includes a PC 80, and multi-function devices 10 and 90 which are peripheral systems of the PC 80. The PC 80 and the multi-function devices 10 and 90 are capable of communicating with one another through a network cable 4 (i.e., LAN). Incidentally, although a server 110 is shown in FIG. 1, the server 110 is used in a second exemplary embodiment of the invention.

(Configuration of Multi-Function Device 10)

A configuration of a multi-function device 10 will be described. Incidentally, the multi-function device 90 has the same configuration as the multi-function device 10. The multi-function device 10 can perform a plurality of functions including a printing function and a scanning function. The multi-function device 10 includes an operation unit 12, a display unit 14, a USB interface 16, a network interface 18, a control unit 20, a printing unit 60, and a scanning unit 70. Each of the units 12 to 20, 60, and 70 is connected to a bus line 11. The operation unit 12 is composed of a plurality of keys, etc. A user can input various instructions to the multi-function device 10 by operating the operation unit 12. The display unit 14 is a display for displaying various information. An USB memory 8, which is a portable external memory, is connectable to the USB interface 16. The network interface 18 is connected with the network cable 4.

The control unit 20 includes a CPU 22, a ROM 24 and a RAM 26. The CPU 22 performs various processes according to a program (not shown) stored in the ROM 24. The CPU performs processes according to the program so as to implement functions of an image processing unit 42 and an outputting unit 44. The ROM 24 stores a first input-side international color consortium (ICC) profile 30, an output-side ICC profile 32 and a second input-side ICC profile 34. Each of the ICC profiles 30, 32 and 34 is stored in the ROM 24 in advance by a vendor of the multi-function device 10.

The first input-side ICC profile 30 is a profile for converting image data, which is represented by device-dependent colors (RGB colors in the first exemplary embodiment) dependent on the characteristics (specifically, color characteristics) of the multi-function device 10, into image data, which is represented by device-independent colors (L*a*b* colors in the first exemplary embodiment) independent from the characteristics of the device. In other words, the first input-side ICC profile 30 is a profile for converting image data, in which a value of each pixel is represented by coordinate values in an RGB color space, into image data, in which a value of each pixel is represented by coordinate values in an L*a*b* color space. More specifically, the first input-side ICC profile 30 is a profile (so-called grid-type color conversion profile) in which a plurality of sets of coordinate values in the RGB color space are mapped with a plurality of sets of coordinate values in the L*a*b* color space. Incidentally, in a modification, the first input-side ICC profile 30 may be an ICC profile (so-called a function-type color conversion profile) representing functions for converting coordinate values in the RGB color space into coordinate values in the L*a*b* color space.

The output-side ICC profile 32 is a profile for converting image data, which is represented by device-independent colors (L*a*b* colors in the first exemplary embodiment) independent from the characteristics of the device, into image data, which is represented by standard colors (sRGB colors in the first exemplary embodiment). The standard colors are colors represented in a predetermined standard color space (sRGB color space in the first exemplary embodiment). In other words, the output-side ICC profile 32 is a profile for converting image data, in which a value of each pixel is represented by coordinate values in the L*a*b* color space, into image data, in which a value of each pixel is represented by coordinate values in the sRGB color space. In the first exemplary embodiment, the output-side ICC profile 32 is a function-type color conversion profile for converting coordinate values in the L*a*b* color space into coordinate values in the sRGB color space. However, in a modification, the output-side ICC profile 32 may be a grid-type color conversion profile for performing color conversion from L*a*b* to sRGB.

The second input-side ICC profile 34 is a profile for converting image data, which is represented by the standard colors (sRGB colors in the first exemplary embodiment), into image data, which is represented by the device-independent colors (L*a*b* colors in the first exemplary embodiment) independent from the characteristic of the device. In other words, the second input-side ICC profile 34 is a profile for converting image data, in which a value of each pixel is represented by coordinate values in the sRGB color space, into image data, in which a value of each pixel is represented by coordinate values in the L*a*b* color space. In the first exemplary embodiment, the second input-side ICC profile 34 is a function-type color conversion profile for converting coordinate values in the sRGB color space into coordinate values in the L*a*b* color space. However, in a modification, the second input-side ICC profile 34 may be a grid-type color conversion profile for performing color conversion from sRGB to L*a*b*.

The printing unit 60 has a printing mechanism of an inkjet type, a laser type, or the like. For example, upon receiving data for print transmitted from the PC 80 by the network interface 18, the printing unit 60 performs a printing process according the received print data. The scanning unit 70 includes a transparent plate, an auto document feeder (ADF) and a scanning mechanism. The scanning mechanism includes an image sensor such as a CCD, a CIS, or the like. The scanning unit 70 scans a document (a scan subject) placed on the transparent plate or a document fed by the auto document feeder, so as to generate scan image data. The scan image data is BMP-formatted (bitmap-formatted) image data of a 256-level gray scale of RGB.

(Processes Performed by Multi-Function Device 10)

The contents of processes performed by the multi-function device 10 will be described with reference to FIG. 2. If the user performs predetermined operation, the control unit 20 performs a scanning process shown in FIG. 2. The predetermined operation includes connecting the USB memory 8 to the USB interface 16, placing a document on the transparent plate or the auto document feeder, and inputting a scan resolution to the operation unit 12.

In step S10, the control unit 20 instructs the scanning unit 70 to perform scanning according to the scan resolution input by the user. As a result, the scanning unit 70 scans a document so as to generate BMP-formatted scan image data of RGB. Further, in step S10, the control unit 20 generates JPEG data by using the scan image date. The control unit 20 compresses the scan image data so as to generate compressed image data, and then generates the JPEG data including various kinds of information, such as a JPEG header, a JPEG footer, and the like, and the compressed image data. Incidentally, since a method of generating the JPEG data is known, a detailed description thereof is omitted.

Next, in step S12, the control unit 20 displays on the display unit 14 character strings for inquiring the user whether the user wants an image process to be performed. Specifically, the control unit 20 displays on the display unit 14 three character strings of a first kind representing three kinds of color correction, that is, 'brightness correction', 'contrast correction', and 'RGB color correction' and a character string of a second kind representing 'No color correction'. The brightness correction is correction for increasing and decreasing the brightness of an entire image. The contrast correction is correction for making a relatively bright portion of an image brighter and making a relatively dark portion of the image darker. The RGB color correction is correction for increasing and decreasing a tinge of any one of RGB (for example, a tinge of red). The user can select one character string from among the three character strings of the first kind and the character string of the second kind by operating the operation unit 12. In a case where the user selects the character string of the second kind representing 'No color correction', the determination result of the control unit 20 in step S12 is NO, such that the scanning process proceeds to step S42.

On the other hand, in a case where the user selects any one character string of the three character strings of the first kind, in step S12, the control unit 20 further displays a message, which encourages inputting the degree of color correction, on the display unit 14. For example, in a case where a character string of the first kind representing the brightness correction or the contrast correction is selected, the control unit 20 displays a message, which encourages selecting one numeral value from a predetermined numeral-value range (for example, from −50% to 50%), on the display unit 14. Further, for example, in a case where a character string of the first kind representing the RGB color correction is selected, the control unit 20 displays a message, which encourages selecting one kind of color of RGB and selecting one numeral value from the predetermined numeral-value range (for example, from −50% to 50%), on the display unit 14. The user can input the degree of color correction (additionally, one color in the case of the RGB color correction) by operating the operation unit 12. If this input operation is performed, the determination result of the control unit 20 in step S12 is YES, and the scanning process proceeds to step S14.

In step S14, the image processing unit 42 (see FIG. 1) determines whether the color correction selected by the user is the brightness correction or the contrast correction, or not. In a case where a character string of the first kind representing the brightness correction or the contrast correction is selected in step S12 by the user, the determination result of the image processing unit 42 in step S14 is YES, and the scanning process proceeds to step S16. On the other hand, in a case where the character string of the first kind representing the RGB color correction is selected in step S12 by the user, the determination result of the image processing unit 42 in step S14 is NO, and the scanning process proceeds to step S26.

(Brightness Correction and Contrast Correction)

In step S16, the image processing unit 42 first decompresses the compressed image data included in the JPEG data generated in step S10, so as to generate BMP-formatted scan image data of RGB (the scan image data generated in step S10 by the scanning unit 70).

Further, in step S16, the image processing unit 42 further performs a color conversion process on the scan image data by using the first input-side ICC profile 30 stored in the ROM 24 so as to generate L*a*b* image data. First, the image processing unit 42 specifies RGB values of one pixel (hereinafter, referred to as RGB values of a subject pixel) in the scan image data. As described above, in the first exemplary embodiment, the first input-side ICC profile 30 is a grid-type color conversion profile. In a case where the first input-side ICC profile 30 includes the same RGB coordinate values as the RGB values of the subject pixel, the image processing unit 42 specifies L*a*b* coordinate values mapped with the corresponding RGB coordinate values from the first input-side ICC profile 30 so as to convert the RGB values of the subject pixel into the L*a*b* coordinate values. On the other hand, in a case where the first input-side ICC profile 30 does not include the same RGB coordinate values as the RGB values of the subject pixel, the image processing unit 42 performs an interpolation process on the basis of the relationship between each set of RGB coordinate values and each set of L*a*b* coordinate values in the first input-side ICC profile 30 so as to convert the RGB values of the subject pixel into the L*a*b* coordinate values.

Like the case of the RGB values of the subject pixel, the image processing unit 42 performs conversion from RGB values into L*a*b* coordinate values on the other pixels in the scan image data so as to generate L*a*b* image data (having a BMP format) from the scan image data. When the L*a*b* image data is generated, the scanning process proceeds to step S18.

In step S18, the image processing unit 42 performs a color correction process on the L*a*b* image data generated in step S16 so as to generate color-corrected L*a*b* image data (having a BMP format). As described above, in the case where the brightness correction or the contrast correction is selected by the user, the degree of correction (which is one number value in the range of −50% to 50%) is also selected by the user. Therefore, for example, in a case where the brightness correction is selected by the user, the image processing unit 42 changes L* coordinate values of each of all pixels included in the L*a*b* image data according to the degree of correction selected by the user. For example, in a case where the degree of correction selected by the user is a positive value, the image processing unit 42 changes the L* coordinate value of each pixel such that the L* coordinate value of each pixel increases (that is, the entire image becomes brighter). On the other hand, for example, in a case where the degree of correction selected by the user is a negative value, the image processing unit 42 changes the L* coordinate value of each pixel such that the L* coordinate value of each pixel decreases (that is, the entire image becomes darker). That is, in a case where the L* coordinate value of a pixel before the brightness correction is L1 and the degree of correction selected by the user is C1(%), the L* coordinate value of the pixel after the brightness correction is 'L1×(100+C1)/100'.

For example, in a case where the contrast correction is selected by the user, the image processing unit 42 first specifies a pixel group of a first kind having a relatively large L* coordinate value and a pixel group of a second kind having a relatively small L* coordinate value, from all of the pixels included in the L*a*b* image data. Next, the image processing unit 42 changes the L* coordinate value of each of the pixels included in the pixel groups of the first kind and the second kind, according to the degree of correction selected by the user. For example, in a case where the degree of correction selected by the user is a positive value, the image processing unit 42 changes the L* coordinate value of each pixel such that the L* coordinate value of the pixel group of the first kind becomes larger and the L* coordinate value of the pixel group of the second kind becomes smaller (that is, the contrast increases). On the other hand, for example, in a case where the degree of correction selected by the user is a negative value, the image processing unit 42 changes the L* coordinate value of each pixel such that the L* coordinate value of the pixel group of the first kind becomes smaller and the L* coordinate value of the pixel group of the second kind becomes larger (that is, the contrast decreases). That is, in a case where the L* coordinate values of the pixel group of the first kind before the contrast correction is L2, the L* coordinate values of the pixel group of the second kind before the contrast correction is L2', and the degree of correction selected by the user is C2(%), the L* coordinate values of the pixel group of the first kind after the contrast correction is 'L2×(100+C2)/100', and the L* coordinate values of the pixel group of the second kind after the contrast correction is 'L2'×(100−C2)/100'.

Next, in step S20, the image processing unit 42 performs a color conversion process on the color-corrected L*a*b* image data generated in step S18 by using the output-side ICC profile 32 stored in the ROM24 so as to generate color-corrected sRGB image data (having a BMP format). First, the image processing unit 42 specifies L*a*b* coordinate values of one pixel (hereinafter, referred to as L*a*b* coordinate values of a subject pixel) in the color-corrected L*a*b* image data. As described above, in the first exemplary embodiment, the output-side ICC profile 32 is a function-type color correction profile. The image processing unit 42 calculates sRGB values by substituting the L*a*b* coordinate values of the subject pixel to functions represented by the output-side ICC profile 32. According thereto, the image processing unit 42 converts the L*a*b* coordinate values of the subject pixel into the sRGB values.

Like the case of the L*a*b* coordinate values of the subject pixel, the image processing unit 42 performs conversion from L*a*b* coordinate values to sRGB values on each of the other pixels in the color-corrected L*a*b* image data. In this way, color-corrected sRGB image data is generated from the color-corrected L*a*b* image data. Further, in step S20, the image processing unit 42 compresses the color-corrected sRGB image data so as to generate color-corrected compressed image data. Furthermore, in step S20, the image processing unit 42 generates color-corrected JPEG data including a JPEG header, the color-corrected compressed image data and a JPEG footer. When the color-corrected JPEG data is generated, the scanning process proceeds to step S40.

(RGB Color Correction Process)

Next, processes of steps S26 to S30 performed in a case of NO in step S14 (a case where the RGB color correction is selected by the user) will be described. In step S26, the image processing unit 42 performs the same color conversion process as step S16 so as to generate L*a*b* image data.

In step S28, the image processing unit 42 performs a color conversion process on the L*a*b* image data generated in step S26 by using the output-side ICC profile 32 stored in the ROM 24 so as to generate sRGB image data. The process of step S28 is the same as the color conversion process of step S20 except that the L*a*b* image data generated in step S26 is a subject of the color conversion process.

Next, in step S30, the image processing unit 42 performs a color correction process on the sRGB image data generated in step S28 so as to generate color-corrected sRGB image data. As described above, in the case where the RGB color correction is selected by the user, a color (one kind of color of RGB), which is a correction subject, and the degree of correction (one numeral value in a range of −50% to 50%) are also selected by the user. The image processing unit 42 changes a value corresponding to the correction subject color of each of all pixels included in the sRGB image data generated in step S28, according to the degree of correction selected by the user. For example, in a case where the correction subject color selected by the user is red (R), and the degree of correction is a positive value, the image processing unit 42 changes the R value of each pixel such that the R value of each pixel increases (that is, the tinge of red of the entire image increases). On the other hand, for example, in a case where the correction subject color selected by the user is red (R), and the degree of correction is a negative value, the image processing unit 42 changes the R value of each pixel such that the R value of each pixel decreases (that is, the tinge of red of the entire image decreases). When the correction subject color is green (G) or blue (B), the image processing unit 42 changes the value of each pixel, like the case of red (R). That is, in a case where a value corresponding to the correction subject color of a pixel before the RGB color correction is P, and the degree of correction selected by the user is C3(%), a value corresponding to the correction subject color of the pixel after the RGB color correction is 'P×(100+C3)/100'.

Further, in step S30, the image processing unit 42 compresses the color-corrected sRGB image data so as to generate color-corrected compressed image data. Furthermore, in step S30, the image processing unit 42 generates color-corrected JPEG data including a JPEG header, the color-corrected compressed image data and a JPEG footer. When the color-corrected JPEG data is generated, the scanning process proceeds to step S40.

Incidentally, in the first exemplary embodiment, the compressed image data is generated in step S10, and the compressed image data is decompressed and is subject to the color conversion process and the color correction process in steps S16 to S20 or S26 to S30. Although not shown in the flow chart of FIG. 2, in steps S16 to S20 or S26 to S30, the image processing unit 42 repeats partially decompressing the compressed image data and performing the color conversion process and the color correction process. According to this configuration, it is possible to reduce data capacity in the RAM 26, as compared to a configuration in which the entire scan image data is stored in the RAM 26 without generating the compressed image data in step S10 and is subjected to the color conversion process and the color correction process.

In step S40, the outputting unit 44 (see FIG. 1) outputs a data file 6 with PDF/A (international standard specified by the International Organization for Standardization (ISO)), which includes the color-corrected JPEG data generated in step S20 or S30, and the second input-side ICC profile 34 stored in the ROM 24, to the outside. Specifically, the outputting unit 44 writes the one data file 6 in the USB memory 8. When the process of step S40 is completed, the scanning process is finished.

In step S42 performed in a case of NO in step S12 (a case where the 'No color correction' is selected by the user), the outputting unit 44 outputs one data file 6 (see FIG. 1) with PDF/A, which includes the JPEG data generated in step S10 (that is, the JPEG data including the compressed image data which has not been subjected to the image processes of steps S16 to S20 or S26 to S30), and the first input-side ICC profile 30 stored in the ROM 24, to the outside. Specifically, the outputting unit 44 writes the one data file 6 in the USB memory 8. When the process of step S42 is completed, the scanning process is finished.

Incidentally, since the JPEG data (or the color-corrected JPEG data) and the first input-side ICC profile 30 (or the second input-side ICC profile 34) are included in the same data file 6, the process of step S40 or S42 may be referred to as a process of mapping the JPEG data with the color conversion profile and outputting the JPEG data and the color conversion profile. Here, the mapping can be performed in various forms. In a first modification, the outputting unit 44 may perform the mapping by outputting one folder including a file of the JPEG data, and the color conversion profile different from the file of the JPEG data. In a second modification, the outputting unit 44 may perform the mapping by including information on the color conversion profile (for example, a file name of the color conversion profile) in the file of the JPEG data. In a third modification, the outputting unit 44 may perform the mapping by outputting the file of the JPEG data, the color conversion profile different from the file of the JPEG data, and information for liking the file of the JPEG data with the color conversion profile.

In the first exemplary embodiment, the format of the data file 6 output in step S40 or S42 is PDF/A. Alternatively, the data file 6 may have another format (for example, PDF). Further, for example, the outputting unit 44 may output a data file 6 having a format designated by the user. In this modification, the outputting unit 44 may output a PDF/A data file 6 in a case where PDF/A is designated by the user, and output a PDF data file 6 in a case where PDF is designated by the user. It is required to attach a color conversion profile to the PDF/A data file (which will be described later). In contrast, any color conversion profile may not be attached to the PDF data file. For this reason, in this modification, in a case where a data file 6 having a first kind of format (for example, PDF/A) should be output in step S40, the outputting unit 44 may output a data file 6 including the second input-side ICC profile 34. Further, in a case where a data file 6 having a second kind of format (for example, PDF) should be output in step S40, the outputting unit 44 may output a data file 6 without the second input-side ICC profile 34 (that is, only the color-corrected JPEG data). Incidentally, even in a case where a data file 6 having any format (for example, PDF) of the first kind and second kind of formats should be output in step S42, it is preferable for the outputting unit 44 to output a data file 6 including the first input-side ICC profile 30. This is because a device (for example the PC 80) for using the data file 6 needs to convert the JPEG data, which is represented by device-dependent colors depending on the characteristics of (the scanning unit 70 of) the multi-function device 10, into the L*a*b* image data represented by device-independent colors.

(Processes of External Device)

The user can carry the USB memory 8 including the data file 6. The user can connect the USB memory 8 to the USB interface of the PC 80 (that is, an external device) so as to allow the PC 80 to read the data file 6 in the USB memory 8. For example, in a case where the data file 6 output in step S40 of FIG. 2 is read by the PC 80, a control unit (not shown) of the PC 80 decompresses the color-corrected compressed JPEG image data included in the color-corrected JPEG data in the data file 6 and generates color-corrected sRGB image data (that is, the color-corrected sRGB image data generated in step S20 or S30 of FIG. 2). Next, the control unit of the PC 80 outputs an image by using the color-corrected sRGB image data.

As described above, in the first exemplary embodiment, the format of the data file 6 is PDF/A. Color conversion using an ICC profile is required for using the PDF/A format. Therefore, the control unit of the PC 80 performs the color conversion process on the color-corrected sRGB image data by using the second input-side ICC profile 34 included in the PDF/A data file 6 so as to generate the L*a*b* image data. Further, the control unit of the PC 80 converts the L*a*b* image data into output image data represented by device-dependent colors depending on the characteristics of the PC 80 (specifically, the color characteristics of a monitor of the PC 80). The output-side ICC profile of the PC 80 for performing that conversion is generally stored in the PC 80 in advance. In the first exemplary embodiment, since the monitor of the PC 80 corresponds to sRGB, the output-side ICC profile of the PC 80 is a profile for performing color conversion from L*a*b* into sRGB. The control unit of the PC 80 provides the output image data represented by sRGB to the monitor of the PC 80. Accordingly, an image represented by the output image data can be displayed on the monitor of the PC 80, and the user can see the image having been subjected to the color conversion.

Figure 2:
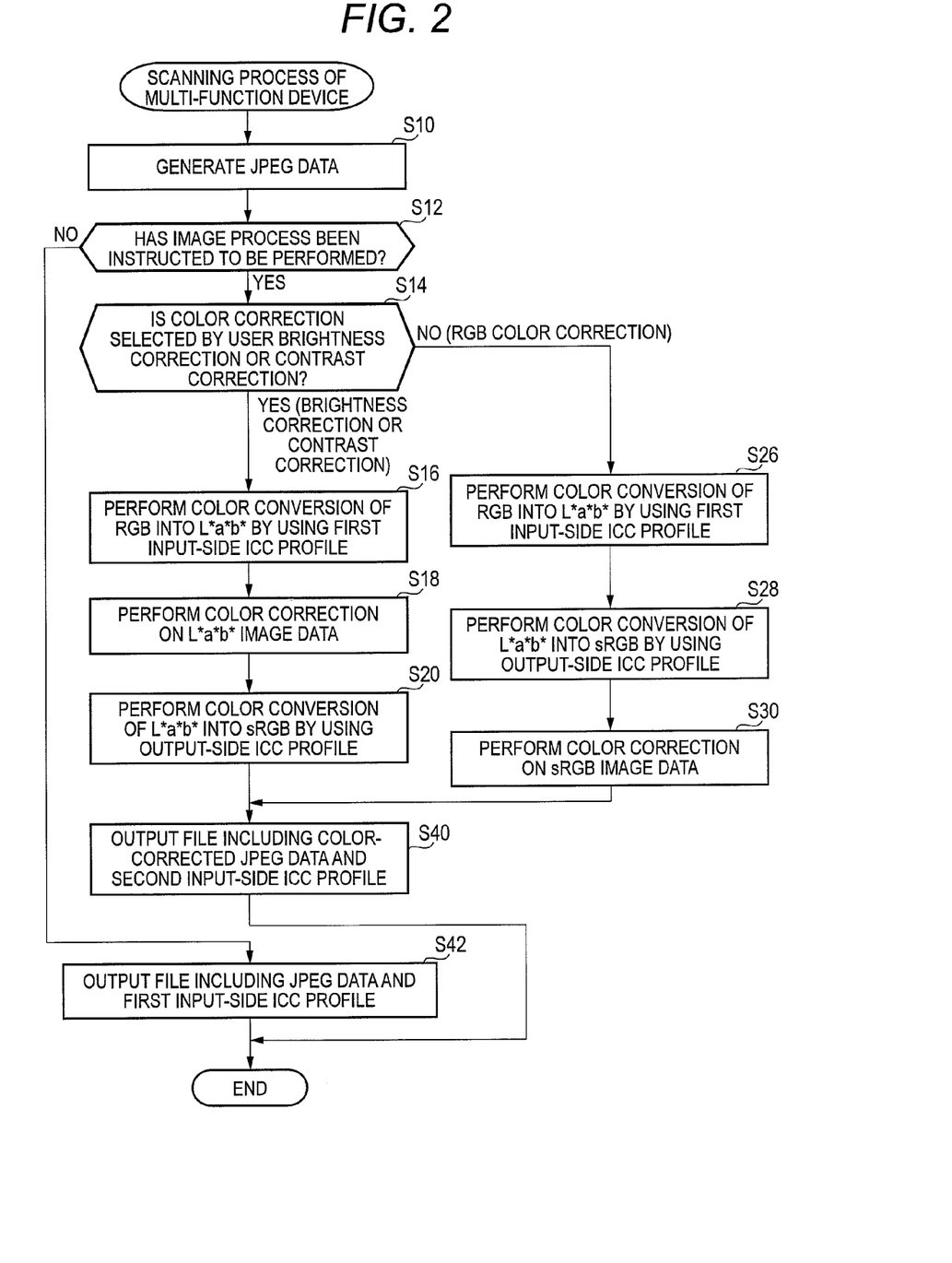
FIG. 2 shows a flow chart of a scanning process of a multi-function device according to a first exemplary embodiment of the invention.

In the first exemplary embodiment, the second input-side ICC profile 34 is output together with the color-corrected JPEG data in step S40 of FIG. 2. Therefore, even when the format of the data file 6 is PDF/A, the PC 80 can output an image by using the color-corrected JPEG data.

Incidentally, as described with respect to the above-mentioned modification, in a case where the PDF data file 6 is output in step S40 of FIG. 2, for example, the data file 6 may not include the second input-side ICC profile 34. In this case, the control unit of the PC 80 may decompress the color-corrected compressed image data included in the PDF data file 6 so as to generate the color-corrected sRGB image data, and then provide the color-corrected sRGB image data to the monitor of the PC without performing any color conversion processes. Since the monitor of the PC corresponds to sRGB, the monitor of the PC can display the image represented by the color-corrected sRGB image data.

Also, for example, in a case where the data file 6 output in step S42 of FIG. 2 is read to the PC 80, the control unit of the PC 80 decompresses the compressed image data (that is, the compressed image data having been not subject to steps S16 to S20 or S26 to S30) included in thee JPEG data of the data file 6 so as to generate scan image data (that is, the scan image data generated in step S10 of FIG. 2 by the scanning unit 70). Next, the control unit of the PC 80 performs a color conversion process on the scan image data by using the first input-side ICC profile 30 of the data file 6 so as to generate L*a*b* image data. Further, the control unit of the PC 80 performs a color conversion process on the L*a*b* image data by using the output-side ICC profile of the PC 80 so as to generate output image data represented by sRGB. The control unit of the PC 80 provides the output image data to the monitor of the PC 80. Therefore, an image represented by the output image data can be displayed on the monitor of the PC 80, and the user can see the image having not been subject to any color correction.

Figure 3A:
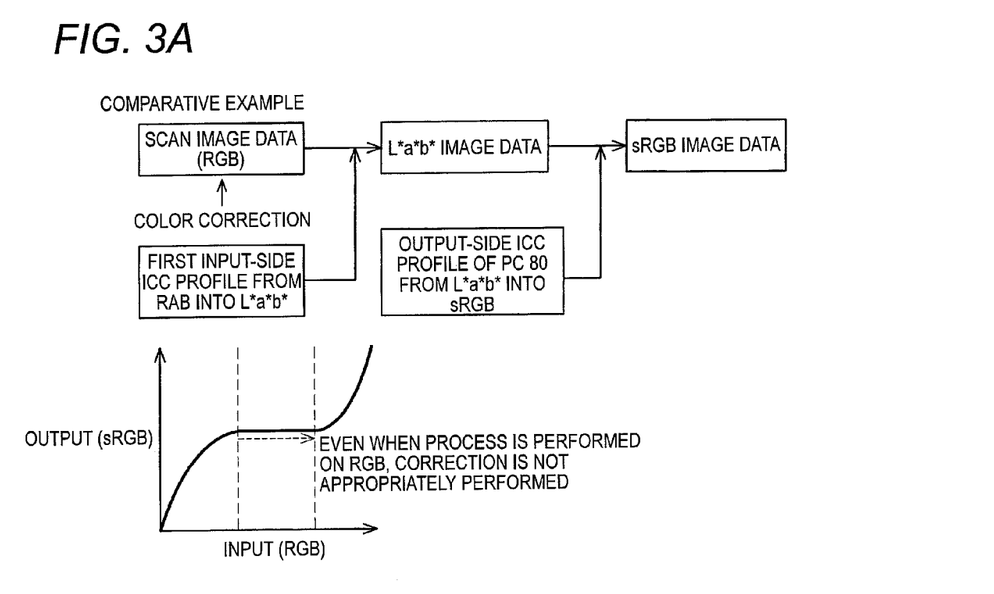
FIGS. 3A and 3B are views for explaining an image process according to a comparative example and an image process according to the first exemplary embodiment.

It may be considered to adopt a configuration according to a comparative example shown in FIG. 3A. That is, in a case where the user instructs color correction (brightness correction, contrast correction, or RGB color correction) to be performed, a multi-function device of the comparative example performs the color correction process on scan image data obtained by decompressing the compressed image data included in the JPEG data generated in step S10 of FIG. 2 so as to generate color-corrected image data. Further, the multi-function device of the comparative example outputs a data file including the color-corrected image data and the first input-side ICC profile 30 to the outside. In this case, the control unit of the PC 80 performs a color conversion process on the color-corrected image data by using the first input-side ICC profile 30 so as to generate L*a*b* image data. Furthermore, the control unit of the PC 80 performs a color conversion process on the L*a*b* image data by using the output-side ICC profile (which is a profile for performing conversion from L*a*b* into sRGB) of the PC 80 so as to generate sRGB image data (that is, output image data). The control unit of the PC 80 provides the sRGB image data to the monitor of the PC 80.

FIG. 3A also shows a graph representing the relationship between input values and output values of the comparative example. The input values are RGB values which are subjects of the color conversion process, and the output values are sRGB values after the color conversion process is performed on the input values by using the first input-side ICC profile 30 and the output-side ICC profile of the PC 80. As shown by the graph of FIG. 3A, even when the input values change, the output values may not change by the same degrees as the changes of the input values. This is because the characteristics of the first input-side ICC profile 30 exert influence. For example, it is assumed a case where the first input-side ICC profile 30 converts first RGB values into first L*a*b* coordinate values and converts second RGB values into second L*a*b* coordinate values. In a case where the first RGB values are corrected into the second RGB values by a brightness correction process with the degree of correction of 10%, for example, the brightness-corrected second RGB values are color-converted into the second L*a*b* coordinate values by the first input-side ICC profile 30. However, a difference in brightness between the first L*a*b* coordinate values and the second L*a*b* coordinate values may be smaller than 10%. Thus, in a case where the first input-side ICC profile 30 performing that color conversion is used for generating L*a*b* image data, even when the brightness correction process with the degree of correction of 10% is performed on the scan image data, the generated L*a*b* image data does not appropriately reflect the contents of the brightness correction process with the degree of correction of 10%. As a result, sRGB image data (that is, output image data) obtained from the L*a*b* image data also does not appropriately reflect the contents of the brightness correction process with the degree of correction of 10%. For this reason, according to the configuration of the comparative example, since the color correction process is performed on the scan image data, an image represented by the sRGB image data (that is, the output image data) may not appropriately reflect the contents of the color correction process (that is, the degree of correction selected by the user).

Figure 3B:
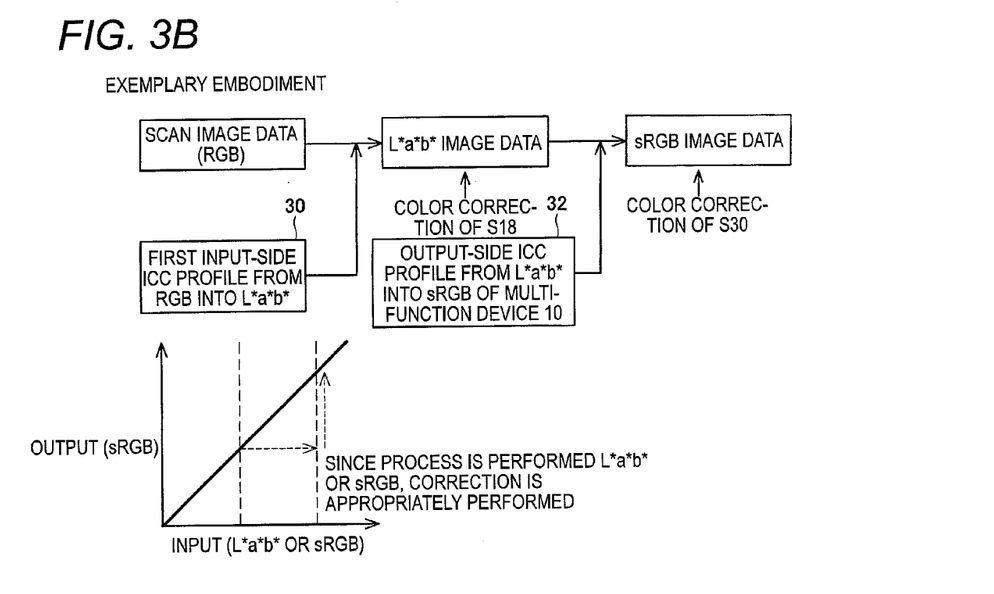

In contrast, as shown in FIG. 3B, the multi-function device 10 of the first exemplary embodiment performs the color correction process on the L*a*b* image data or the sRGB image data after the color conversion process using the first input-side ICC profile 30 (step S18 or S30 of FIG. 2). FIG. 3B also shows a graph representing the relationship between input values and output values according to the first exemplary embodiment. For example, in a case where the color correction process is performed on the L*a*b* image data in step S18 of FIG. 2, the input values are L*a*b* coordinate values which are subjects of the color correction process of step S18 of FIG. 2, and the output values are sRGB values output to the outside in step S40 of FIG. 2. Also, for example, in a case where the color correction process is performed on the sRGB image data in step S30 of FIG. 2, the input values are sRGB values which are subjects of the color correction process of step S30 of FIG. 2, and the output values are sRGB values output to the outside in step S40 of FIG. 2. As shown by the graph of FIG. 3B, if the input values (L*a*b* coordinate values or sRGB values) change, the output values change by the same degrees as the changes of the input values. This is because the first input-side ICC profile 30 does not exert influence.

As described above, in the first exemplary embodiment, the multi-function device 10 performs the color correction process on the L*a*b* image data or the sRGB image data considering the characteristics of the first input-side ICC profile 30. As a result, the multi-function device 10 can generate and output the color-corrected JPEG data considering the characteristics of the first input-side ICC profile 30. Therefore, the PC 80 can output an image appropriately reflecting the contents of the color correction process by using the color-corrected JPEG data, as compared to the configuration of the comparative example.

Incidentally, there may be a case where the user may input the JPEG data of the data file 6 output in step S42 of FIG. 2 to the PC 80 and then instruct the PC 80 to perform the color correction process, for example. In this case, the PC 80 may decompress the compressed image data of the JPEG data so as to generate the scan image data, and then perform the color correction process on the scan image data. In this case, the color-corrected image data which does not appropriately reflect the contents of the color correction process can be generated like the comparative example. However, the PC 80 can display an image after the color correction process on the monitor of the PC 80 by using the color-corrected image data. If seeing the image, the user can find that the color correction process has not been appropriately performed. Therefore, in order to obtain an image desired by the user, the user can instruct the PC 80 to perform an additional color correction process. However, in the first exemplary embodiment, the color correction process is performed by the multi-function device 10, not the PC 80. Since the display unit 14 of the multi-function device 10 is comparatively smaller than the monitor of the PC 80, even when a configuration in which an image after a color correction process is displayed on the display unit 14 of the multi-function device 10 is used, it is difficult for the user to grasp whether the color correction process has been appropriately performed or not. Considering the actual circumferences in which, in a case where the multi-function device 10 performs the color correction process, it is difficult for the user to check the image after the color correction process, the first exemplary embodiment uses the configuration for performing the color correction process on the L*a*b* image data or the sRGB image data, such that an image appropriately reflecting the contents of the color correction process instructed by the user is output.

The L* coordinate values in the L*a*b* color space are values representing the brightness. The brightness correction and the contrast correction are processes for correcting the brightness. Therefore, the multi-function device 10 of the first exemplary embodiment performs the brightness correction and the contrast correction in the L*a*b* color space having an axis representing the brightness (step S18 of FIG. 2). On the other hand, the RGB color correction is a process for correcting a tinge of any color of RGB. Therefore, the multi-function device 10 of the first exemplary embodiment performs the RGB color correction in the sRGB color space having axes representing RGB (step S30 of FIG. 2). According to the first exemplary embodiment, it is possible to selectively perform an appropriate color correction process according to an instruction of the user. That is, it is possible to perform a color correction process, instructed by the user, in an appropriate color space according to the kind of the color correction process.

The components of the first exemplary embodiment and the components of the invention will be described. The single multi-function device 10 is an example of the scanner system. The scan image data and the compressed image data included in the JPEG data generated in step S10 of FIG. 2 are examples of first subject image data and second subject image data, respectively. Further, steps S16, S18, and S20 of FIG. 2 are examples of image processes of a first kind. Therefore, the L*a*b* image data generated in step S16 of FIG. 2 and the color-corrected L*a*b* image data generated in step S18 of FIG. 2 are examples of color-converted image data of a first kind and color-corrected image data, respectively. Furthermore, the color-corrected compressed data included in the JPEG data output in step S40 through steps S16 to S20 of FIG. 2 is an example of processed image data of a first kind. Moreover, steps S26, S28, and S30 of FIG. 2 are examples of image processes of a second kind. Therefore, the L*a*b* image data generated in step S26 of FIG. 2 and the sRGB image data generated in step S28 of FIG. 2 are examples of the color-converted image data of the first kind and color-converted image data of a second kind. The color-corrected compressed image data included in the JPEG data output in step S40 through steps S26 to S30 of FIG. 2 is an example of processed image data of a second kind.

Second Exemplary Embodiment

Differences between a second exemplary embodiment and the first exemplary embodiment will be described. In the second exemplary embodiment, the multi-function device 10 does not include the image processing unit 42, and the server 110 includes an image processing unit 142. The server 110 is connected to the network cable 4 (i.e., LAN) through the Internet 100. The server 110 stores the output-side ICC profile 32 and the second input-side ICC profile 34 in advance. Further, the ROM 24 of the multi-function device 10 stores the first input-side ICC profile 30 in advance, but the ROM 24 does not store the output-side ICC profile 32 and the second input-side ICC profile 34.

(Processes Performed by Multi-Function Device 10 and Server 110)

Figure 4:
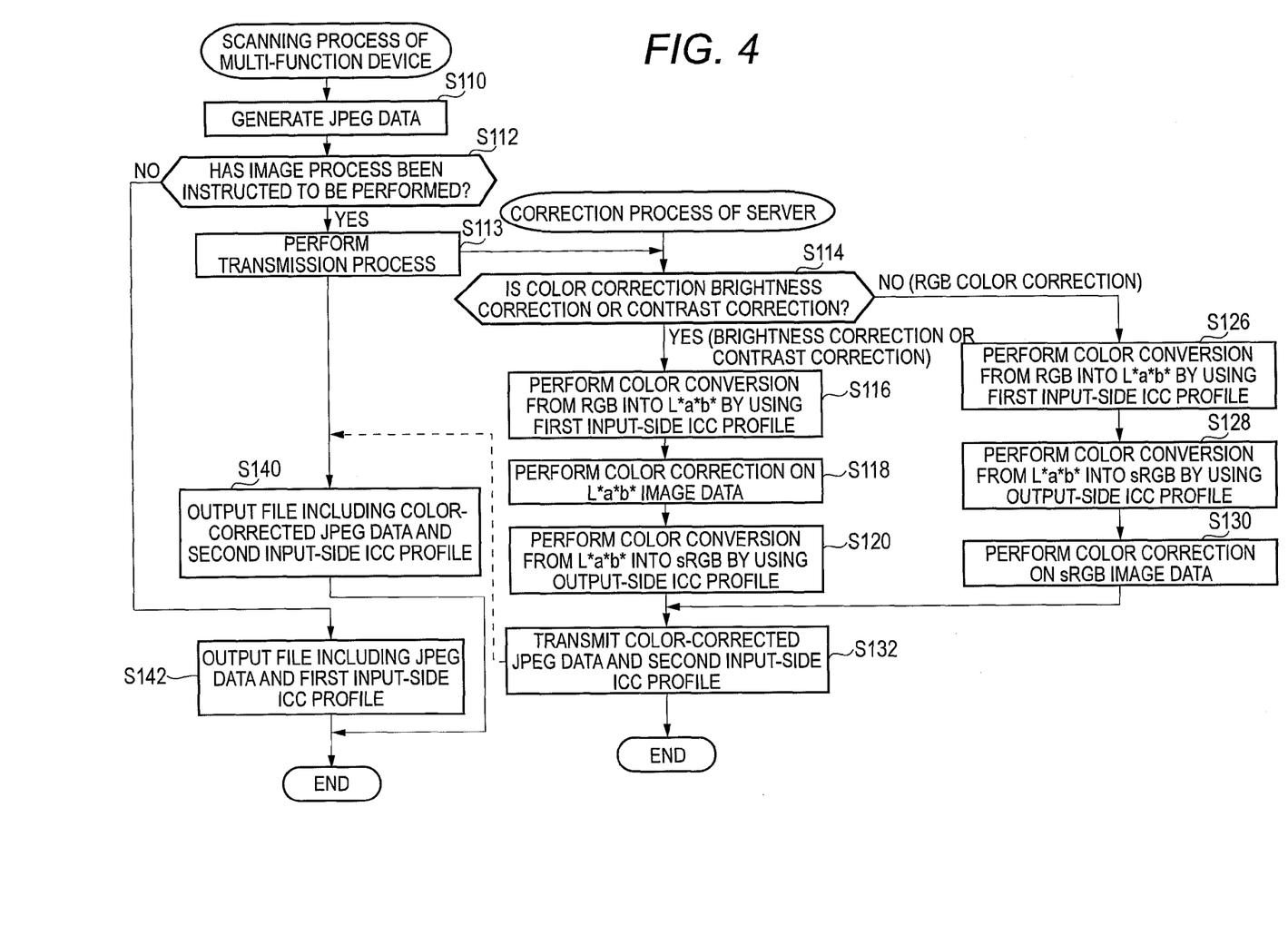
FIG. 4 shows a flow chart of a scanning process of a multi-function device and a flow chart of a correction process of a server according to a second exemplary embodiment of the invention.

The contents of processes performed by the multi-function device 10 and the server 110 will be described with reference to FIG. 4. Processes of steps S110 and S112 performed by the control unit 20 of the multi-function device 10 are the same as the processes of steps S10 and S12 of FIG. 2. In a case of YES in step S112, in step S113, the control unit 20 transmits the JPEG data generated in step S110, the first input-side ICC profile 30 stored in the ROM 24, information representing the kind of color correction (brightness correction, contrast correction, or RGB color correction) selected by the user, and information representing the degree of color correction (additionally, a correction subject color in the case of the RGB color correction), to the server 110.

Upon receiving the information transmitted from the multi-function device 10, the server 110 starts the correction process. First, in step S114, the image processing unit 142 of the server 110 (see FIG. 1) determines whether the color correction selected by the user is the brightness correction or the contrast correction, or not. The process of step S114 is the same as step S14 of FIG. 2. In a case of YES in step S114, the correction process proceeds to step S116. On the other hand, in a case of NO in step S114, the correction process proceeds to step S126.

Processes of steps S116 to S120 performed by the image processing unit 142 are the same as the processes of steps S16 to S20 of FIG. 2. Further, processes of steps S126 to S130 performed by the image processing unit 142 are the same as the processes of steps S26 to S30 of FIG. 2. However, in steps S116 and S126, the image processing unit 142 performs the color conversion process by using the first input-side ICC profile 30 received from the multi-function device 10. Further, in steps S120 and S128, the image processing unit 142 performs the color conversion process by using the output-side ICC profile 32 stored in the server 110 in advance.

After completing step S120 or S130, the image processing unit 142 transmits the color-corrected JPEG data, and the second input-side ICC profile 34 stored in the server 110 in advance, to the multi-function device 10 (step S132). After completing the process of step S132, the correction process of the server 110 finishes.

When the multifunction device 10 receives the information (the color-corrected JPEG data and the second input-side ICC profile 34) transmitted from the server 110, the outputting unit 44 of the multi-function device 10 outputs one PDF/A data file 6 including the information received from the server 110 to the outside in step S140. The process of step S140 is the same as the process of step S40 of FIG. 2. Further, a process of step S142 performed in a case of NO in step S112 is the same as the process of step S42 of FIG. 2.

In the second exemplary embodiment, the same effects as the first exemplary embodiment can be achieved. Specifically, the multi-function device 10 has a process speed slower than the server 110. In the second exemplary embodiment, since the multi-function device 10 need not perform any image process, the image processing can be quickly performed. As a result, the data file 6 can be quickly output. Further, the amount of storage capacity of the memory of the multi-function device 10 is smaller than that of the server 110. In the second exemplary embodiment, since the multi-function device 10 need not perform any image process, it is possible to suppress a phenomenon in which the available capacity of the memory of the multi-function device 10 is insufficient from occurring during the performance of the image process. In the second exemplary embodiment, the system including the multi-function device 10 and the server 110 is an example of the scanner system.

(Modification to Exemplary Embodiments)

(First Modification) In the first exemplary embodiment, in a case where the user instructs the image process to be performed (a case of YES in step S12 of FIG. 2), the image processing unit 42 performs the color conversion process (either step S16 or steps S26 and S28 of FIG. 2) on the scan image data generated by the scanning unit 70. Alternatively, the image processing unit 42 may adjust the number of colors of each pixel in the scan image data (for example, from a 512-level gray scale into a 256-level gray scale), and then perform the color conversion process on the adjusted image data, for example. In general, the first subject image data may be image data obtained from the scan image data, and more specifically, the scan image data itself or image data generated by performing various processes (an adjustment process and the like) on the scan image data. The configuration of a first modification is also applicable to the image processing unit 142 of the second exemplary embodiment.

(Second Modification) In the first exemplary embodiment, in a case where the user does not instruct performance of any image process (a case of NO in step S12 of FIG. 2), the outputting unit 44 outputs the compressed image data, which is obtained by compressing the scan image data generated by the scanning unit 70, to the outside (step S42 of FIG. 2). Alternatively, the outputting unit 44 may output the scan image data itself to the outside, for example. Further, the outputting unit 44 may output adjusted image data, which is generated by performing a process of adjusting the number of colors on the scan image data, to the outside. In general, the second subject image data may be image data obtained from the scan image data without performing any image processes (image processes including a first kind of color conversion process and color correction process), and more specifically, the scan image data itself or image data generated by performing various processes (an adjustment process, a compression process, and the like) on the scan image data.

(Third Modification) As described with respect to the second modification, for example, in a case where the outputting unit 44 outputs the scan image data to the outside in step S42 of FIG. 2, not only the image data which is an output subject in step S42 of FIG. 2 but also the image data which is a subject of the image processes of FIGS. S16 to S20 or the like of FIG. 2 is the scan image data. However, in the first exemplary embodiment, the image data which is an output subject in step S42 of FIG. 2 is the compressed image data, and the image data which is a subject of the image processes of FIGS. S16 to S20 or the like of FIG. 2 is the scan image data. That is, in general, the first subject image data and the second subject image data may be the same image data or may be different from each other.

(Fourth Modification) In the first and second exemplary embodiments, the L*a*b* color space is used. Alternatively, an XYZ color space may be used. For example, the first input-side ICC profile 30 may be a profile for converting RGB image data into image data (that is, XYZ image data) in which a value of each pixel is represented by coordinate values in the XYZ color space. That is, in general, the first input-side ICC profile may be a profile for converting image data, in which a value of each pixel is represented by coordinate values in a first color space (which is the RGB color space in the first and second exemplary embodiments), into first intermediate image data in which a value of each pixel is represented by coordinate value in a second color space (which is the L*a*b* color space in the first and second exemplary embodiments and in the XYZ color space in the fourth modification). Incidentally, the first color space may be a color space depending on the characteristics (specifically, color characteristics) of the scanning unit like the first and second exemplary embodiments, or a standard color space (for example, the sRGB color space). Further, the second color space may be a color space independent from the characteristics of the device like the first and second exemplary embodiments, or a standard color space.

(Fifth Modification) For example, the output-side ICC profile 32 may be a profile for converting XYZ image data to sRGB image data. That is, in general, the output-side ICC profile may be a profile for converting image data, in which a value of each pixel is represented by coordinate values in the second color space (which is the L*a*b* color space in the first and second exemplary embodiments and the XYZ color space in the fifth modification), into second intermediate image data in which a value of each pixel is represented by coordinate values in a third color space (which is the sRGB color space in the first and second exemplary embodiments). The third color space may be a standard color space like the first and second exemplary embodiments, or a color space (for example, the RGB color space) depending on the characteristics of the multi-function device 10.

(Sixth Modification) For example, the second input-side ICC profile 34 may be a profile for converting sRGB image data into XYZ image data. In general, the second input-side ICC profile may be a profile for converting image data, in which a value of each pixel is represented by coordinate values in the third color space (which is the sRGB color space in the first and second exemplary embodiments), into third intermediate image data in which a value of each pixel is represented by coordinated values in a fourth color space (which is the L*a*b* color space in the first and second exemplary embodiments and the XYZ color space in the sixth modification). Incidentally, the fourth color space may be a color space independent from the characteristics of the device like the first and second exemplary embodiments, or a standard color space. The first to fourth color spaces may be different from one another. However, two or more color spaces of the first to fourth color spaces may be the same color space.

(Seventh Modification) For example, the output-side ICC profile 32 may be a profile for converting L*a*b* image data into Adobe RGB image data represented by an Adobe RGB color space. In this case, the second input-side ICC profile 34 may be a profile for converting Adobe RGB image data into L*a*b* image data. In general, in a case where the output-side ICC profile is a profile for converting the second color space (which is the L*a*b* color space in the first and second exemplary embodiments) into the third color space (which is the sRGB color space in the first and second exemplary embodiments and is the Adobe RGB color space in the seventh modification), the second input-side ICC profile may be a profile for performing conversion from the second color space into the third color space. According to this configuration, it is possible to output the second input-side ICC profile appropriate for the processed image data.

(Eighth Modification) In the first and second exemplary embodiments, in steps S40 and S42 of FIG. 2, the outputting unit 44 writes the data file 6 in the USB memory 8 and outputs the data file 6 to the outside, for example. Alternatively, the outputting unit 44 may transmit the data file 6 to the PC (that is, an external device) 80, or may transmit the data file 6 to another multi-function device 90, or may write the data file 6 in a medium such as a CD, a DVD, or the like to be provided in the multi-function device 10. All of the cases are included in the configuration for performing output to the outside.

(Ninth Modification) In the second exemplary embodiment, the multi-function device 10 includes the outputting unit 44. Alternatively, the server 110 may include the outputting unit 44. For example, in a case where a destination of the transmission of the color-corrected JPEG data (for example, the PC 80) is notified from the multi-function device 10 to the server 110, the outputting unit 44 of the server 110 may transmit a file including the color-corrected JPEG data and the second input-side ICC profile 34 to the transmission destination notified from the multi-function device 10.

(Tenth Modification) In the first exemplary embodiment, the image processing unit 42 performs the brightness correction or the contrast correction on the L*a*b* image data (step S18 of FIG. 2). Alternatively, the image processing unit 42 may perform the brightness correction or the contrast correction on the sRGB image data generated through the processes of steps S26 and S28. In the tenth modification, the color correction process (step S18 of FIG. 2) is not performed on the L*a*b* image data. Also, in the first exemplary embodiment, the image processing unit 42 performs the RGB color correction process on the sRGB image data (step S30 of FIG. 2). Alternatively, the image processing unit 42 may perform the RGB color correction process on the L*a*b* image data generated through the process of step S16. In the tenth modification, the color correction process (step S30 of FIG. 2) is not performed on the sRGB image data. That is, in general, the image processing unit 42 may perform both of the first kind of image processes and the second kind of image process, or may perform either the first kind of image processes or the second kind of image process. The configuration of the tenth modification is also applicable to the image processing unit 142 of the second exemplary embodiment.

(Eleventh Modification) For example, in a case where both of the brightness correction process and the RGB color correction process are instructed to be performed, the image processing unit 42 may first perform the brightness correction process on the L*a*b* image data so as to generate brightness-corrected L*a*b* image data, second perform a color conversion process on the brightness-corrected L*a*b* image data by using the output-side ICC profile 32 so as to generate brightness-corrected sRGB image data, and third perform the RGB color correction process on the brightness-corrected sRGB image data so as to generate color-corrected sRGB image data. That is, in general, the image process may include: the first kind of color conversion process (for example, color conversion from RGB into L*a*b*) on the first subject image data (for example, the scan image data); the first kind of color correction process (for example, a brightness correction process) on the first-kind color-converted image data (for example, L*a*b* image data); the second kind of color conversion process (for example, color conversion from L*a*b* into RGB) on the color-corrected image data (for example, brightness-corrected L*a*b* image data) generated by the first kind of color correction process; and the second color correction process (for example, the RGB color correction process) on the second color-converted image data (for example, brightness-corrected sRGB image data) generated by the second kind of color conversion process.

(Twelfth Modification) The image processing units 42 and 142 may perform a color correction process of a kind different from the first and second exemplary embodiments. For example, the image processing units 42 and 142 may perform white balance correction, chroma correction, etc. In general, the color correction process may be a process for changing a value of at least one pixel in the color-converted image data.

(Thirteenth Modification) In the first and second exemplary embodiments, in steps S10, S20 and S30 of FIG. 2 and the like, the JPEG formatted data is generated. Alternatively, data having a format (for example, a TIFF format or a BMP format) other than the JPEG format may be generated.

(Fourteenth Modification) The functions of each unit (for example, the scanning unit 70, the image processing unit 42, or the outputting unit 44) disclosed in the present specification may be implemented by hardware such as logic circuits or the like, or may be implemented by software.

Specific examples of the present invention have been described in detail above; however, these examples are merely illustrative, and do not restrict the scope of the claims. Any of various modifications and changes of the specific examples illustrated above are included in the scope of the claims.

Moreover, the technical elements described in the present specification and drawings exhibit technical usefulness either alone or in any of various combinations, and there is no limitation to the combinations described in the claims at the time of filing. Moreover, the art illustrated in the present specification and drawings attains a plurality of objects simultaneously, but there is technical usefulness in attaining one of these objects.

What is claimed is:

1. A scanner system comprising:
a scanning unit configured to scan a document;
a processor configured to determine whether to perform a first process or a second process based on whether a color correction process is a contrast or brightness correction, wherein the first process is performed if the color correction process includes a contrast or brightness correction and the second process is performed if the color correction process modifies a color value; and
implement at least one of the first process and the second process;
wherein the first process comprises:
generating scan image data in accordance with the scanning by the scanning unit, wherein each pixel of the scan image data is defined as a coordinate in an RGB color space;
generating a first image data by applying a first input-side color conversion profile to the scan image data, wherein each pixel of the first image data is defined as a coordinate in a second color space different from the RGB color space, wherein the second color space is a L*a*b* color space and each coordinate in the L*a*b* color space corresponds to the associated coordinate in the RGB color space;
generating a second image data by correcting at least one of contrast and brightness of the first image data in the L*a*b* color space by changing a value of at least one coordinate within the L*a*b* color space;
generating a third image data by applying an output-side color conversion profile to the second image data, wherein each pixel of the third image data is defined as a coordinate in a third color space different from the second color space, wherein the third color space comprises an sRGB color space;
generating a first processed image data based on the third image data; and
outputting the first processed image data with a second input-side color conversion profile in the sRGB color space, the second input-side color conversion profile being different from the first input-side color conversion profile; and
wherein the second process comprises:
generating the scan image data in accordance with the scanning by the scanning unit, wherein each pixel of the scan image data is defined as a coordinate in the RGB color space;
generating the first image data by applying the first input-side color conversion profile to the scan image data, wherein each pixel of the first image data is defined as a coordinate in the L*a*b* color space and each coordinate in the L*a*b* color space corresponds to the associated coordinate in the RGB color space;
generating a fourth image data by applying the output-side color conversion profile to the first image data, wherein each pixel of the fourth image data is defined as coordinate in the sRGB color space and converted from the L*a*b* color space without correcting at least one of contrast and brightness of the first image data in the L*a*b* color space;
generating a fifth image data by correcting at least one RGB value of the fourth image data within the sRGB color space by changing the at least one RGB value;
generating a second processed image data based on the fifth image data; and
outputting the second processed image data with the second input-side color conversion profile.

2. The scanner system according to claim 1, wherein the processor is further configured to implement a third process, the third process comprising:
generating the scan image data in accordance with the scanning by the scanning unit, wherein each pixel of the scan image data is defined as a coordinate in the first color space; outputting the scan image data with the first input-side color conversion profile.

3. The scanner system according to claim 1, further comprising:
a scanner device that comprises the scanning unit; and
a server that is connected to the scanner device through a network and comprises the processor.

4. The scanner system according to claim 1, wherein the processor is further configured to receive an instruction,
in a case where the instruction indicates that the first process is to be implemented, the processor implements the first process,
in a case where the instruction indicates that the second process is to be implemented, the processor implements the second process, and
in a case where the instruction indicates that no correction is necessary, the processor implements the third process.

5. A non-transitory computer-readable medium having a computer program stored thereon and readable by a computer, the computer program, when executed by the computer, causing the computer to perform:
scanning a document;
determine whether to perform a first process or a second process based on whether a color correction process is a contrast or brightness correction, wherein the first process is performed if the color correction process includes a contrast or brightness correction and the second process is performed if the color correction process modifies a color value; and
implementing at least one of the first process and the second process,
wherein the first process comprises:
generating scan image data in accordance with the scanning by the scanning unit, wherein each pixel of the scan image data is defined as a coordinate in an RGB color space;
generating a first image data by applying a first input-side color conversion profile to the scan image data, wherein each pixel of the first image data is defined as a coordinate in a second color space different from the RGB color space, wherein the second color space is a L*a*b* color space and each coordinate in the L*a*b* color space corresponds to the associated coordinate in the RGB color space;
generating a second image data by correcting at least one of contrast and brightness of the first image data in the L*a*b* color space by changing a value of at least one coordinate within the L*a*b* color space;
generating a third image data by applying an output-side color conversion profile to the second image data, wherein each pixel of the third image data is defined as a coordinate in a third color space different from the second color space, wherein the third color space comprises an sRGB color space;
generating a first processed image data based on the third image data; and
outputting the first processed image data with a second input-side color conversion profile in the sRGB color space, the second input-side color conversion profile being different from the first input-side color conversion profile; and
wherein the second process comprises:
generating the scan image data in accordance with the scanning by the scanning unit, wherein each pixel of the scan image data is defined as a coordinate in the RGB color space;
generating the first image data by applying the first input-side color conversion profile to the scan image data, wherein each pixel of the first image data is defined as a coordinate in the L*a*b* color space and each coordinate in the L*a*b* color space corresponds to the associated coordinate in the RGB color space;
generating a fourth image data by applying the output-side color conversion profile to the first image data, wherein each pixel of the fourth image data is defined as coordinate in the sRGB color space and converted from the L*a*b* color space without correcting at least one of contrast and brightness of the first image data in the L*a*b* color space;
generating a fifth image data by correcting at least one RGB value of the fourth image data within the sRGB color space by changing the at least one RGB value;
generating a second processed image data based on the fifth image data; and
outputting the second processed image data with the second input-side color conversion profile.

6. A scanner system comprising:
a scanning unit configured to scan a document;
a processor configured to perform a method comprising:
generating scan image data in accordance with the scanning by the scanning unit, wherein each pixel of the scan image data is defined as a coordinate in an RGB color space;
determining whether a color correction process includes correcting at least one of contrast and brightness; and
based on a determination that the color correction process includes correcting at least one of contrast and brightness:
generating a first image data by applying a first input-side color conversion profile to the scan image data, wherein each pixel of the first image data is defined as a coordinate in a L*a*b* color space different from the RGB color space and each coordinate in the L*a*b* color space corresponds to the associated coordinate in the RGB color space;
generating a second image data by correcting at least one of contrast and brightness of the first image data in the L*a*b* color space by changing a value of at least one coordinate within the L*a*b* color space;
generating a third image data by applying an output-side color conversion profile to the second image data, wherein each pixel of the third image data is defined as a coordinate in a sRGB color space different from the L*a*b* color space;
generating a first processed image data based on the third image data; and
outputting the first processed image data with a second input-side color conversion profile in the sRGB color space, the second input-side color conversion profile being different from the first input-side color conversion profile.

7. A scanner system comprising:
a scanning unit configured to scan a document;
a processor configured to perform a method comprising:
generating scan image data in accordance with the scanning by the scanning unit, wherein each pixel of the scan image data is defined as a coordinate in an RGB color space;
determining whether a color correction process includes correcting at least one of contrast and brightness; and
based on a determination that the color correction process does not include correcting at least one of contrast and brightness:
generating first image data by applying a first input-side color conversion profile to the scan image data, wherein each pixel of the first image data is defined as a coordinate in the L*a*b* color space and each coordinate in the L*a*b* color space corresponds to the associated coordinate in the RGB color space;
generating second image data by applying the output-side color conversion profile to the first image data, wherein each pixel of the second image data is defined as coordinate in the sRGB color space and converted from the L*a*b* color space without correcting at least one of contrast and brightness of the first image data in the L*a*b* color space;

generating third image data by correcting at least one RGB value of the second image data within the sRGB color space by changing the at least one RGB value;

generating processed image data based on the third image data; and outputting the processed image data with a second input-side color conversion profile different from the first input-side color conversion profile.

8. The scanner system according to claim 1, wherein correcting at least one of contrast and brightness of the first image data in the L*a*b* color space by changing a value of at least one coordinate within the L*a*b* color space is performed in response to user input.

9. The scanner system according to claim 1, wherein correcting at least one RGB value of the fourth image data within the sRGB color space by changing the at least one RGB value is performed in response to user input.

* * * * *